July 15, 1924.  
L. F. MARSH  
INSULATED CONTAINER  
Filed Sept. 14, 1922

1,501,227

WITNESSES

INVENTOR
L. F. Marsh,
BY
ATTORNEYS

Patented July 15, 1924.

1,501,227

UNITED STATES PATENT OFFICE.

LEWIS F. MARSH, OF SPOKANE, WASHINGTON.

INSULATED CONTAINER.

Application filed September 14, 1922. Serial No. 588,144.

*To all whom it may concern:*

Be it known that I, LEWIS F. MARSH, a citizen of the United States, and resident of Spokane, in the county of Spokane and State of Washington, have invented certain new and useful Improvements in Insulated Containers, of which the following is a specification.

This invention relates generally to containers which are adapted to maintain the contents thereof at a given temperature, and it consists in the combinations, constructions and arrangements herein described and claimed.

An object of the invention is to provide a container of the character described which is adapted to receive ice cream or other frozen food after such substances have been frozen and hardened in the usual manner and to hold such substances in a frozen and hardened condition during shipment or storage without the use of ice and salt, or like materials commonly required to maintain a low temperature within similar containers.

A further object of the invention is to provide a container of the character described which is adapted to permit of access to the interior thereof at will without the temperature being varied appreciably.

Other objects and advantages will be apparent from the following description, and the novel features of the invention will be particularly outlined in the appended claims.

My invention is illustrated in the accompanying drawings, forming a part of this application, in which—

Figure 1:
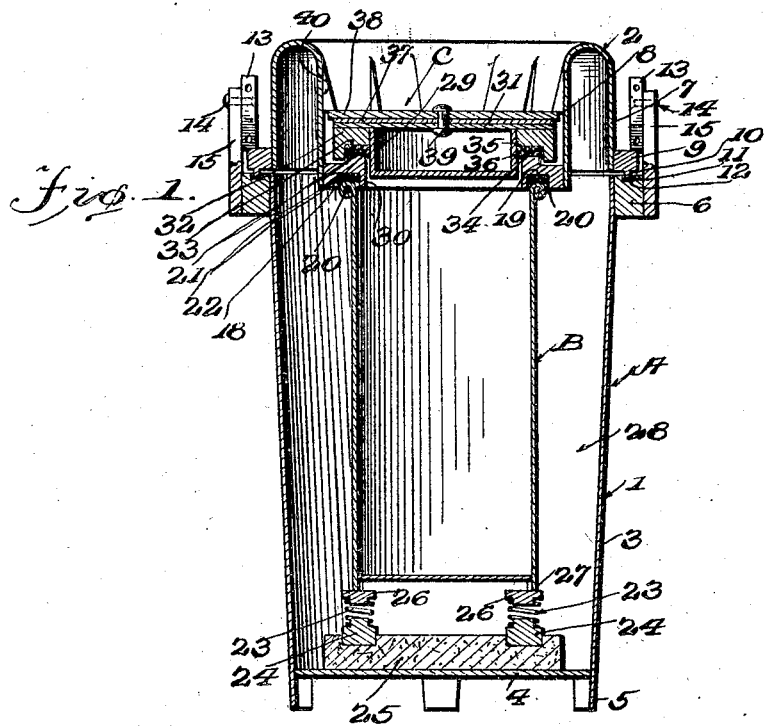
Figure 2:
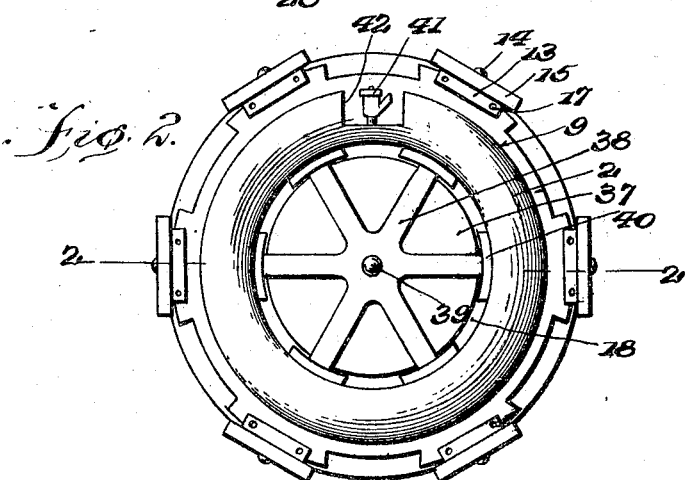
Figure 3:
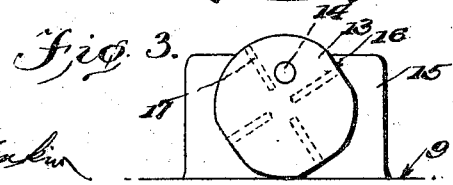

Figure 1 is a vertical central view through a container embodying the invention, the view being taken substantially along the line 2—2 of Figure 2, Figure 2 is a top plan view of the container, and Figure 3 is a relatively enlarged fragmentary elevation of a latching arrangement comprised in the device for holding a cover thereof in closed position.

In carrying out my invention in the form now preferred by me, I provide an outer shell or casing designated generally at A, an inner casing or receptacle B, and a cover designated generally at C.

The outer casing or shell A comprises two sections 1 and 2 respectively, the section 1 being the lower section and including a body 3 of circular contour in cross section and being tapered slightly from its upper end to its juncture with a bottom 4. The body of the outer shell and the bottom thereof may be formed integrally with each other or separately and secured together in any suitable known manner, as by welding, so as to provide an air tight joint therebetween. The body of the outer shell is provided with a plurality of extensions 5 depending below the plane of the bottom in spaced relation with respect to one another and constitute legs for supporting the device and for receiving and imparting to the body of the outer shell shocks and jars which would otherwise be communicated to the inner casing or receptacle B, as will presently appear. Obviously, a depending flange may be provided in lieu of the legs 5 without departing from the spirit and scope of the invention.

The lower section 1 of the outer shell of the casing has an annular flange 6 extending outwardly thereof at its upper edge. The flange 6 may be formed integrally with the body 3 or separately and permanently secured to the latter by welding or in any other suitable manner.

The upper section 2 of the outer shell is annular in contour and is substantially U-shaped in cross section, including an outer side 7 which is substantially equal diametrically at its lower edge with the body of the lower section of the outer shell at the upper edge of the latter. The upper section 2 also includes an inner side 8 which is of greater length than the outer side 7 and is adapted to depend within the body of the lower section of the outer shell when the diametrically equal edges of the lower and upper sections are placed in coincident relation in respect to each other.

An outwardly extending flange 9 on the outer side of the upper section 2 at the lower edge of the latter is adapted to overlie the flange 6 and is fashioned with a depending tongue 10 adapted to enter an annular groove 11 in the upper side of the flange 6. A packing ring 12 which is made of rubber, that is a poor conductor of heat is placed within the groove 11 between the bottom wall thereof and the tongue 10 and is adapted to be depressed when pressure is applied on the upper side of the flange 9 to effect an air tight connection between the flange 9 and the flange 6 and therefore between the upper and lower sections of the outer shell and to at the same time insulatingly space the upper and lower sections of the outer shell slightly apart.

In the embodiment of the invention illustrated, the means for imposing pressure upon the flange 9 to releasably hold the upper and lower sections of the outer shell in connected relation comprises a plurality of spaced circular plates 13 eccentrically mounted upon journals or pins 14 extending inwardly of upstanding supporting arms 15 carried by the flange 6, whereby the peripheries of the locking plates 13 are in contact with the upper side of the flange 9 when rotated to a certain position, as illustrated in Figure 1, and may be rotated out of contact with the flange 9 upon reversal of direction of rotation thereof. As shown in Fig. 3 the locking plates 13 may have portions of its wall slightly flattened, as indicated at 16 to engage with the flat upper flange 9 and thus tend to hold the locking plate against accidental displacement from pressure imposing position. Radial sockets or openings 17 adapted to receive an operating rod are provided at intervals in the peripheral wall of each disk 13 for convenience in rotating the latter to and from pressure imposing positions in respect to the flange 9.

The inner side of the upper section 2 is provided with an inwardly extending flange 18 at its lower edge and this flange has an annular groove 19 in its lower side adapted to receive the beaded or rolled upper edge portion 20 of the inner casing or receptacle B, when the latter is supported within the outer shell in a manner to be described. Two superposed packing rings 21 and 22 respectively are disposed within the groove 19 between the walls of the latter and the upper edge of the inner receptacle. These packing and insulating rings are made of any suitable materials which are adapted to be compressed sufficiently to provide air tight joints between the flange 18 and the inner receptacle, the uppermost ring 21 preferably being made of asbestos and the lowermost ring 22 preferably being made of cork.

The inner receptacle B is spring pressed against the packing rings 21 and 22 by relatively strong expansion springs 23 which react at their lower ends against supporting plates 24 imbedded in a heat insulating and shock absorbing plate 25 resting upon the bottom of the outer shell. The springs 23 react at their upper ends against plates 26 arranged in contact with a depending flange 27 on the body of the inner receptacle B. The strength of the springs 23 is such as to hold the receptacle B against the compressible packing rings 21, 22 with sufficient force to secure an air tight connection between the flange 18 and the inner receptacle B at all times.

It will be apparent that an air tight space 28 is provided between the wall of the outer shell and the inner receptacle by the organization described and that the inner receptacle is flexibly and insulatingly held in spaced connected relation to the outer shell in such manner that shocks imparted to the outer shell will not be likely to disrupt this relation.

The cover C comprises a cylindrical body 29 closed at its lower end and being diametrically smaller than the opening 30 defined by the inner wall of the flange 18. A cover plate 31 secured to the body 29 in any suitable manner, as by welding, is considerably larger diametrically than the body and is arranged in axial alignment therewith so that an annular portion of uniform width extends beyond the outer wall of the body 29. A flange or ring 32 permanently secured to this annular portion of the cover plate extends therefrom and is provided with a rabbet 33 in its inner edge adapted to receive an upstanding annular rib 34 on the flange 18. An upper packing and insulating ring or gasket of asbestos 35 and a lower packing and insulating ring or gasket of cork 36 are arranged in superposed relation within the groove 33 between the walls of the latter and the flange to space the cover C from the flange 18 while providing an air tight connection therebetween. An insulating layer 37 of asbestos or like material is superimposed upon the cover plate 31 and held clamped thereagainst by a top plate 38 which is in the form of a spider wheel for a purpose which will be hereinafter set forth. The top plate 38, the insulating plate 37 and the cover plate 31 are secured together by a rivet 39 or like fastening means.

A plurality of lugs 40 extend inwardly from the inner side of the upper section 2 and have the lower sides thereof disposed in the same horizontal plane and in position to engage with the arms of the top plate 38 when the cover C is rotated to a certain position to impose pressure upon the cover so that the packing and insulating rings 35 and 36 are compressed and the cover C is held in spaced relation to the flange 18 and at the same time an air tight connection is provided between the cover and the flange 18. When the cover C is rotated so that the end portions of the arms of the top plate are located between the lugs 40, the cover C may be lifted bodily from its position on the flange to permit the removal of a substance from the inner receptacle B or the insertion of articles thereinto.

It is desirable that means be provided for exhausting the air from the space 28 and to this end, I provide a valve 41 which is arranged in a re-entrant place 42 in the outer side of the upper section in communication with the space 28. The valve 41 is adapted for connection with a vacuum pump of any suitable known type of construction and likewise may be of any suitable known construction.

From the foregoing description of the various parts of the device, the operation thereof may be readily understood. The invention is designed primarily, although not necessarily, for use in storing or transporting ice cream or other frozen substances. The inner receptacle B may be an ice cream can or container of ordinary construction and may be placed within the lower section of the outer shell after being filled with ice cream or other frozen substance which has been frozen and hardened in the usual manner. The upper section 2 of the outer shell is then placed in position on the lower section and locked to the latter in the manner described so that the space 28 is airtight. The air within the space 28 is then exhausted therefrom through the valve 41 and the latter is closed to maintain a vacuum within the space 28 and between the walls of the outer shell and the inner receptacle. The cover C may be placed in position upon the flange 18 and secured thereon in the manner described either prior or subsequently to the exhausting of the air from the space 28. The frozen and hardened ice cream or other substance within the container B will remain in the condition obtaining at the time the receptacle B was placed within the outer shell and the air exhausted from the space 28 for a relatively long time. The cover C may be removed and replaced at will to permit of part or all of the contents of the receptacle B being removed without the temperature within the receptacle B being raised to any appreciable extent. The outer shell is reinforced at its lower end by the legs 5 and the inner receptacle is flexibly and insulatingly spaced from the outer shell so that a container embodying the invention is particularly well adapted to withstand the shocks and jars ordinarily incident to shipments of like articles. The walls of the outer shell and of the inner receptacle may be made of any suitable material, such as sheet steel of a gauge ordinarily used in the construction of milk cans and like articles.

Obviously, my invention is susceptible of embodiment in forms other than that illustrated in the accompanying drawings, and I therefore consider as my own all modifications and adaptations of the form of the device herein disclosed, which fairly fall within the scope of the appended claims.

Having thus described the invention, what is claimed is:—

1. A container of the character described comprising an outer shell consisting of a lower section closed at its lower end and open at its upper end, and an upper section substantially U-shaped in cross section and having an outer side substantially equal diametrically at its edge with the lower section at the upper edge of the latter, cooperative means carried by said upper and lower sections of the outer shell for locking the outer side of the upper section in superimposed relation to the lower section, an inner receptacle adapted to receive a substance to be maintained at an even temperature and to be received within the lower section of the outer shell when the upper section of the latter has been removed, means arranged between the lower end of the receptacle and the lower end wall of the outer shell for insulatingly supporting the inner receptacle within the outer shell, and means arranged between the inner side of the outer shell and the upper end of the inner receptacle to insulatingly space the inner receptacle from the upper section of the outer shell and to provide an air tight joint between the inner receptacle and the upper section of the outer shell.

2. A container of the character described comprising an outer shell consisting of a lower section closed at its lower end and open at its upper end, and an upper section substantially U-shaped in cross section and having an outer side substantially equal diametrically at its edge with the lower section at the upper edge of the latter, cooperative means carried by said upper and lower sections of the outer shell for locking the outer side of the upper section in superimposed relation to the lower section, an inner receptacle adapted to receive a substance to be maintained at an even temperature and to be received within the lower section of the outer shell when the upper section of the latter has been removed, means arranged between the lower end of the receptacle and the lower end wall of the outer shell for insulatingly supporting the inner receptacle within the outer shell, and means arranged between the inner side of the outer shell and the upper end of the inner receptacle to insulatingly space the inner receptacle from the upper section of the outer shell and to provide an air tight joint between the inner receptacle and the upper section of the outer shell, and means carried by the upper section of the outer shell whereby communication may be established between the space between the outer shell and the inner receptacle, and a vacuum pump for exhausting the air from said space.

3. A container of the character described comprising an outer shell consisting of a lower section closed at its lower end and open at its upper end, and an upper section substantially U-shaped in cross section and having an outer side substantially equal diametrically at its edge with the lower section at the upper edge of the latter, cooperative means carried by said upper and lower sections of the outer shell for locking the outer side of the upper section in superimposed relation to the lower section, an inner receptacle adapted to receive a substance to be maintained at an even temperature and to be received within the lower section of the outer shell when the upper section of the latter has been removed, means arranged between the lower end of the receptacle and the lower end wall of the outer shell for insulatingly supporting the inner receptacle within the outer shell, means arranged between the inner side of the upper section of the outer shell and the upper end of the inner receptacle to insulatingly and flexibly space the inner receptacle at its upper end from the upper section of the outer shell, and insulatingly supported spring means disposed between the lower end of the inner receptacle and the bottom of the outer shell to hold the inner receptacle firmly pressed against the first named insulating and spacing means in such manner as to provide an air tight joint between the inner receptacle and the upper section of the outer shell.

4. A container of the character described comprising an outer shell consisting of a lower section closed at its lower end and open at its upper end, and an upper section substantially U-shaped in cross section and having an outer side substantially equal diametrically at its edge with the lower section at the upper edge of the latter, cooperative means carried by said upper and lower sections of the outer shell for locking the outer side of the upper section in superimposed relation to the lower section, an inner receptacle adapted to receive a substance to be maintained at an even temperature and to be received within the lower section of the outer shell when the upper section of the latter has been removed, means arranged between the lower end of the receptacle and the lower end wall of the outer shell for insulatingly supporting the inner receptacle within the outer shell, means arranged between the inner side of the upper section of the outer shell and the upper end of the inner receptacle to insulatingly and flexibly space the inner receptacle at its upper end from the upper section of the outer shell, insulatingly supported spring means disposed between the lower end of the inner receptacle and the bottom of the outer shell to hold the inner receptacle firmly pressed against the first named insulating and spacing means in such manner as to provide an air tight joint between the inner receptacle and the upper section of the outer shell, and a cover adapted to be insulatingly supported upon said first named insulating and spacing means in position to prevent ingress of air to the inner receptacle.

5. A container of the character described comprising an outer shell consisting of a lower section closed at its lower end and open at its upper end, and an upper section substantially U-shaped in cross section and having an outer side substantially equal diametrically at its edge with the lower section at the upper edge of the latter, cooperative means carried by said upper and lower sections of the outer shell for locking the outer side of the upper section in superimposed relation to the lower section, an inner receptacle adapted to receive a substance to be maintained at an even temperature and to be received within the lower section of the outer shell when the upper section of the latter has been removed, means arranged between the lower end of the receptacle and the lower end wall of the outer shell for insulatingly supporting the inner receptacle within the outer shell, means arranged between the inner side of the upper section of the outer shell and the upper end of the inner receptacle to insulatingly and flexibly space the inner receptacle at its upper end from the upper section of the outer shell, insulatingly supported spring means disposed between the lower end of the inner receptacle and the bottom of the outer shell to hold the inner receptacle firmly pressed against the first named insulating and spacing means in such manner as to provide an air tight joint between the inner receptacle and the upper section of the outer shell, a cover adapted to be insulatingly supported upon said first named insulating and spacing means in position to prevent ingress of air to the inner receptacle, and cooperating means carried by said upper section and said cover whereby the latter may be releasably held in closed position.

6. A container of the character described comprising an outer shell consisting of a lower section closed at its lower end and open at its upper end and an upper section open at both its upper and lower ends, said sections being separably connected together, said upper section having an inwardly extending flange, an inner receptacle adapted to be disposed within said outer shell below the level of said flange, heat insulating packing members arranged between the upper end of said inner receptacle and said flange, and inherently actuated means arranged between the lower ends of said shell and said inner receptacle and urging said inner receptacle upward whereby the inner receptacle will be held in position to clamp said packing members against said flange in such manner that an air tight joint between said flange and said inner receptacle is effected.

7. A container of the character described comprising an outer shell consisting of a lower section closed at its lower end and open at its upper end and an upper section open at both its upper and lower ends, said sections being separably connected together, said upper section having an inwardly extending flange, an inner receptacle adapted to be disposed within said outer shell below the level of said flange, heat insulating packing members arranged between the upper ends of said inner receptacle and said flange, inherently actuated means arranged between the lower ends of said shell and said inner receptacle and urging said inner receptacle upward whereby the inner receptacle will be held in position to clamp said packing members against said flange in such manner that an air tight joint between said flange and said inner receptacle is effected, and a means for closing said flange, said closing means also constituting a cover for said inner receptacle.

LEWIS F. MARSH.